(12) United States Patent
Carter

(10) Patent No.: US 6,910,539 B2
(45) Date of Patent: Jun. 28, 2005

(54) TOOL FOR DRIVING PINS

(76) Inventor: Jon Carter, 16323 Windy Creek Dr., Monument, CO (US) 80132

(*) Notice: Subject to any disclaimer, the term of this patent is extended or adjusted under 35 U.S.C. 154(b) by 0 days.

(21) Appl. No.: 10/645,994

(22) Filed: Aug. 22, 2003

(65) Prior Publication Data

US 2005/0039933 A1 Feb. 24, 2005

(51) Int. Cl.[7] .................................................. E21B 4/18
(52) U.S. Cl. ................................. 173/1; 173/90; 173/92
(58) Field of Search .............................. 173/1, 90, 92, 173/128, 132; 227/109, 130

(56) References Cited

U.S. PATENT DOCUMENTS

| | | | | |
|---|---|---|---|---|
| 1,106,241 A | * | 8/1914 | Richardson | ................. 227/147 |
| 4,627,563 A | * | 12/1986 | Meyer | ......................... 227/130 |
| 4,706,864 A | * | 11/1987 | Jacobsen et al. | ............. 227/109 |
| 4,826,066 A | * | 5/1989 | Koester et al. | ............. 227/120 |
| 5,337,836 A | * | 8/1994 | Williams | ...................... 173/90 |

* cited by examiner

Primary Examiner—Stephen F. Gerrity
Assistant Examiner—Nathaniel Chukwurah
(74) Attorney, Agent, or Firm—Mark G. Pannell; Hanes & Schutz, P.C.

(57) ABSTRACT

A tool is provided for driving a landscape pin. The tool has a frame, a base, a hammer, and driving device. The frame is sized to house the landscape pin. The base is attached to the frame and has a slot formed therein. The slot is disposed within the frame and sized and shaped to accommodate passage of the landscape pin. The hammer is disposed within the frame and aligned with the slot. The driving device applies force to the hammer to drive the landscape pin from the frame and through the slot.

11 Claims, 4 Drawing Sheets

TOOL FOR DRIVING PINS

FIELD OF THE INVENTION

This invention relates in general to a tool for driving pins and, more particularly, to a wall panel system that utilizes an attachment clip system for attachment to a wall.

BACKGROUND OF THE INVENTION

Landscape pins are used to pin landscape fabric or similar material to a ground surface. Usually, the pins are an inverted U-shape with two legs joined together by a linkage at the top. The legs of the pins are inserted through the material and into the ground surface. The linkage remains on top of the material to hold it in place. The pins may be used to hold the material in place either temporarily or permanently.

Often numerous pins are used to hold the material. Inserting numerous pins can be very time consuming. Additionally, landscape pins are usually manufactured from a weak material that is susceptible to bending if the force used to insert it is not properly aligned with the pin. Furthermore, ground surfaces vary in hardness and pins are difficult to insert in to particularly hard ground surfaces.

SUMMARY OF THE INVENTION

According to principles of the present invention, a tool is provided for driving a landscape pin. The tool has a frame, a base, a hammer, and driving means. The frame is sized to house the landscape pin. The base is attached to the frame and has a slot formed therein. The slot is disposed within the frame and sized and shaped to accommodate passage of the landscape pin. The hammer is disposed within the frame and aligned with the slot. The driving means applies force to the hammer to drive the landscape pin from the frame and through the slot.

DETAILED DESCRIPTION OF THE INVENTION

Figure 1:
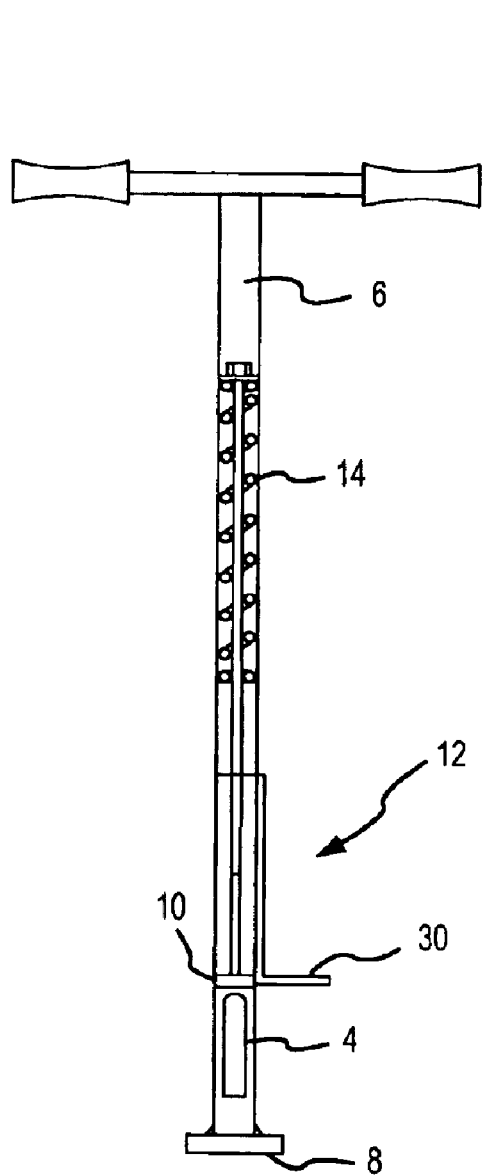
FIG. 1 is a cross-sectional front elevational view of one embodiment of the present invention tool for driving landscape pins.
Figure 2:
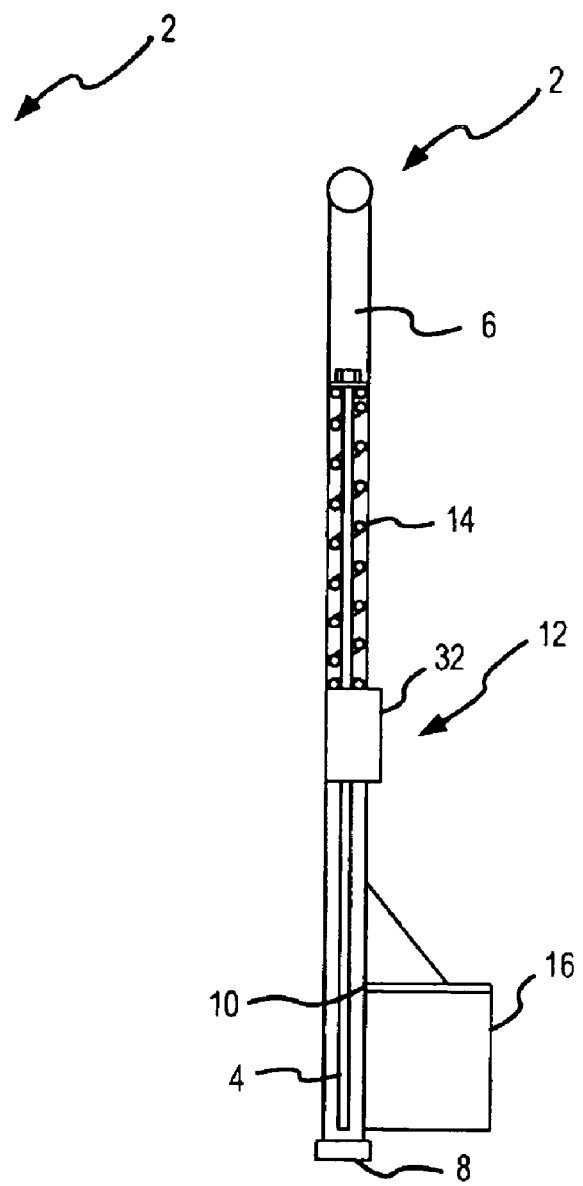
FIG. 2 is a cross-sectional side elevational view of the tool for driving landscape pins of FIG. 1, with an alternate embodiment driving means.

FIG. 1 illustrates one embodiment of the present invention. A tool 2 for driving a landscape pin 4, includes a frame 6, a base 8, a hammer 10, driving means 12, and optionally, return spring 14. FIG. 2 illustrates the tool 2 of FIG. 1 with an alternate embodiment driving means and optional landscape pin magazine 16.

Landscape pin 4 is any pin 4 for holding down landscape fabric material or the like. In one embodiment, shown best in FIG. 3, landscape pin 4 includes a pair of legs 18 joined by a linkage 20. The size and shape of landscape pin 4 may affect the size and shape of the certain aspects of the tool 2.

Frame 6 is any frame or housing sized and configured to house landscape pin 4. Frame 6 is of any dimension. An example of a convenient height includes 48 inches. Frame 6 is any cross-sectional shape of sufficient size to hold landscape pin 4. Examples of cross-sectional shapes include circular, elliptical, rectangular, and square.

Figure 3:
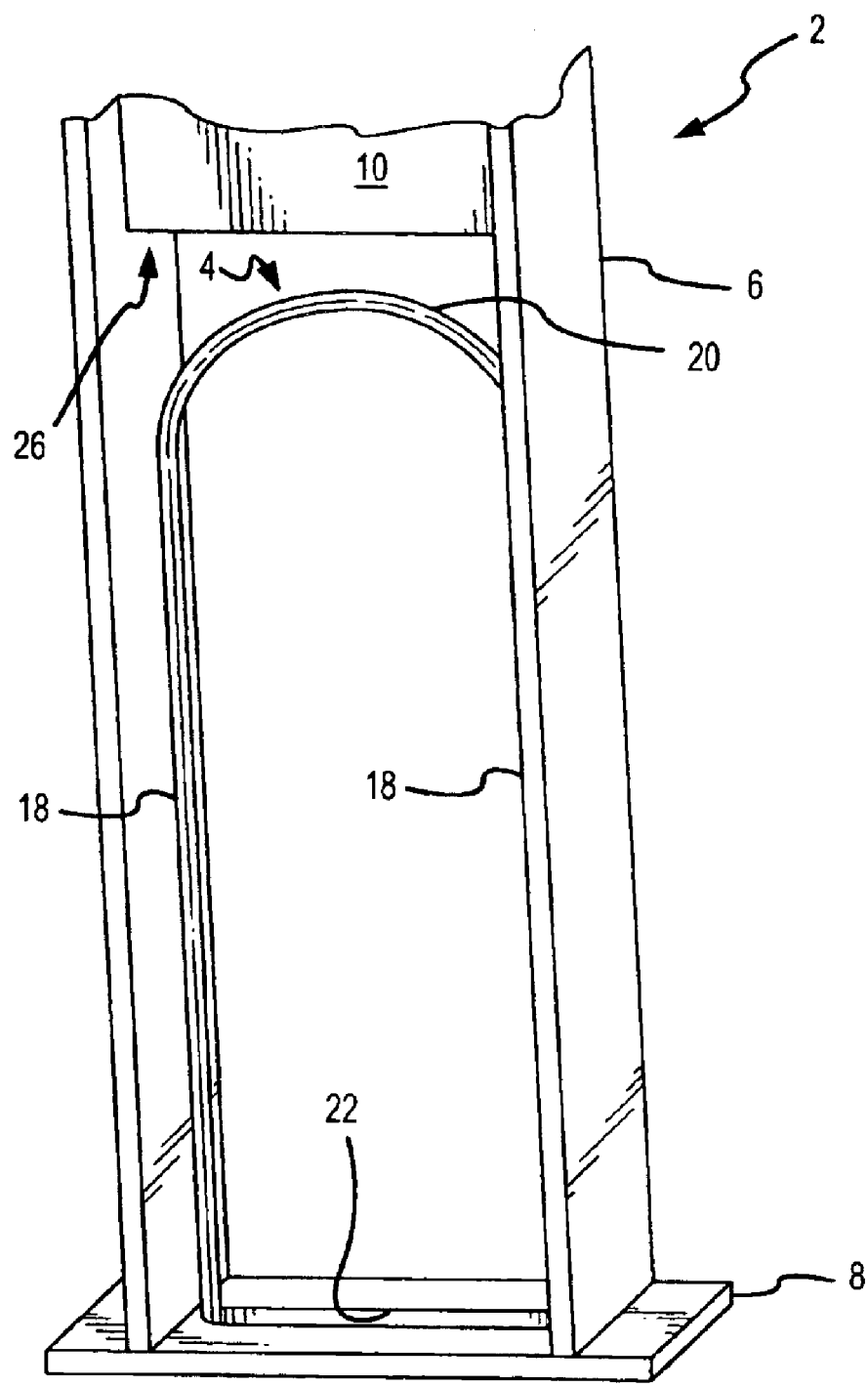
FIG. 3 is a close up cross-sectional perspective view showing the base of the tool for driving landscape pins of FIG. 1 with the hammer in an up position.
Figure 4:
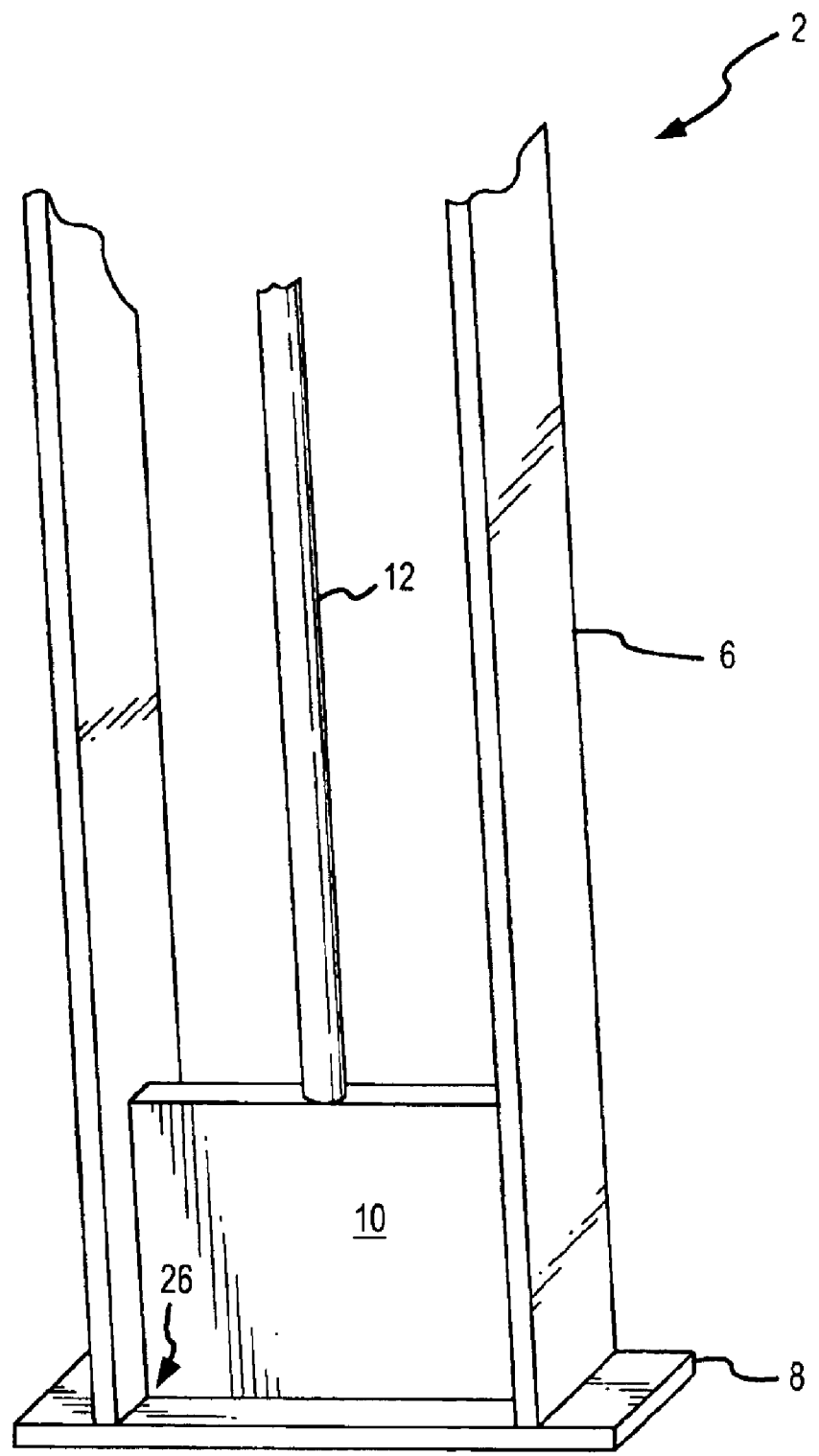
FIG. 4 is a close up cross-sectional perspective view showing the base of the tool for driving landscape pins of FIG. 1 with the hammer in a down position.

Referring to FIG. 3, base 8 is attached to frame 6. A slot 22 is formed in base 8. Slot 22 is disposed within frame 6 and sized and shaped to accommodate passage of landscape pin 4. In one embodiment, base 8 has a thickness similar to a thickness of landscape pin 4. This similarity of thicknesses allows legs 18 of pins 4 to be fully inserted into a ground surface without forcing a linkage 20 of pin 4 through the landscape fabric.

Figure 7:
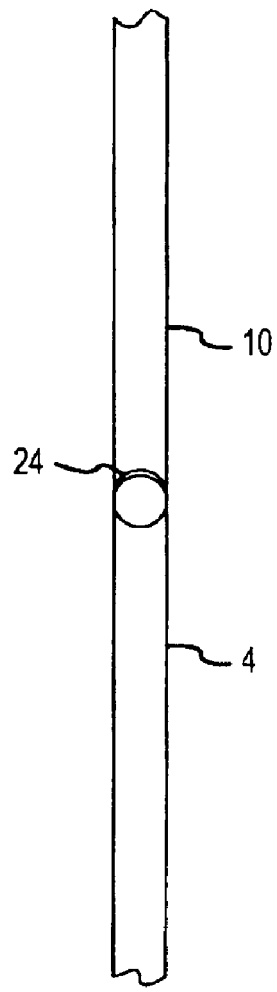
FIG. 7 is a close up cross-sectional side elevational view showing the hammer of FIGS. 1–4 having a cupped edge.

Hammer 10 is disposed within frame 6 and aligned with slot 22. As shown in FIG. 7, in one embodiment, the edge 24 of hammer 10 disposed towards landscape pin 4 is cupped to receive landscape pin 4.

As shown in FIGS. 2 and 3, in one embodiment, hammer 10 includes stop means 26 for preventing hammer 10 from passing through slot 22. One example of stop means 26 includes a portion of hammer 10 exceeding the passable area of slot 22. FIG. 3 illustrates hammer 10 prevented from passing through slot 22 by a corner of hammer 10. The corner is one example of a stop means 26.

Figure 5:
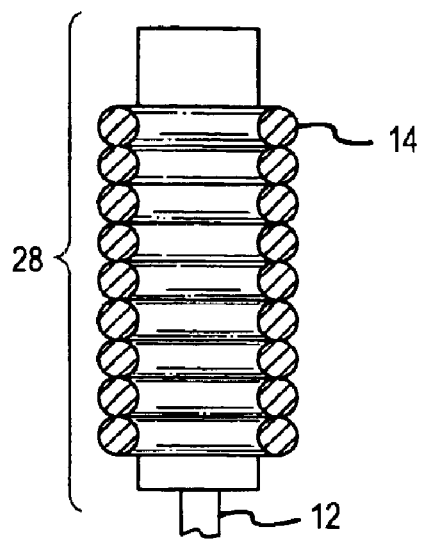
FIG. 5 is an illustration of one embodiment of a stop means for the tool for driving landscape pins of FIG. 1.

In an alternate embodiment, as shown in FIG. 5, tool 2 further including stop means 28 for preventing hammer 10 from passing through slot 22. One example of stop means 28 includes return spring 14 fully compressing to prevent driving means 12 from forcing hammer 10 through slot 22.

Driving means 12 is any means for applying force to hammer 10 to drive landscape pin 4 from frame 6 and through slot 22. In one embodiment as shown in FIG. 1, driving means 12 includes a foot lever 30 coupled to hammer 10 and passing through frame 6. In an alternate embodiment as shown in FIG. 2, driving means 12 includes a powered driver 32 such as a hydraulic driver, a pneumatic driver, or an electrical driver coupled to hammer 10.

Return spring 14 (FIGS. 1 and 2) is any spring or spring-like device configured to resist driving means 12 and urge hammer 10 away from slot 22.

Landscape pin magazine 16 is attached to frame 6 and configured to feed landscape pins 4 into frame 6. Although landscape pin magazine 16 is shown perpendicular to frame 6, it may be at any angle to frame 6.

Figure 6:
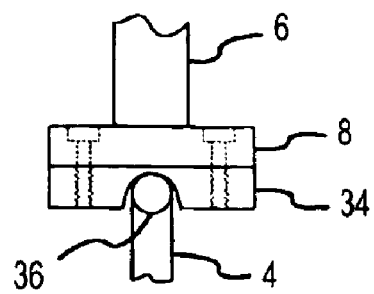
FIG. 6 is a close up cross-sectional front elevational view showing a hose adaptor attached to the base of FIG. 3.

FIG. 6 illustrates optional adaptor plate 34 affixed to base 8. Adaptor plate 34 is shaped to partially surround a diameter of a hose 36 so that hose 36 may be pinned to a ground surface in a similar fashion to pinning the landscape fabric.

Figure 8:
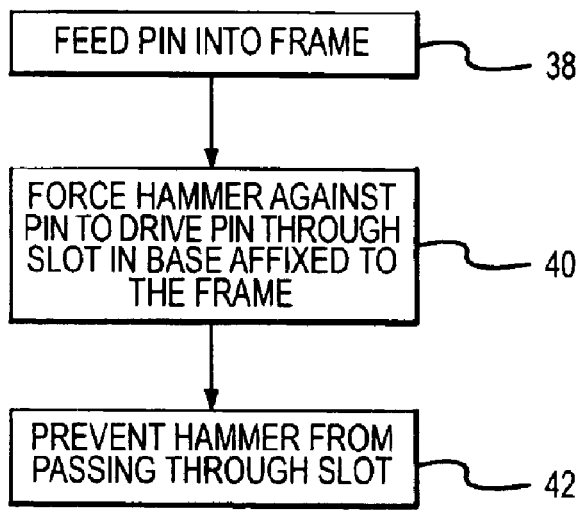
FIG. 8 is a flow chart representing steps of one embodiment of the present invention method for driving a landscape pin.

FIG. 8 is a flow chart representing steps of one embodiment of the present invention. Although the steps represented in FIG. 8 are presented in a specific order, the present invention encompasses variations in the order of steps. Furthermore, additional steps may be executed between the steps illustrated in FIG. 8 without departing from the scope of the present invention.

A landscape pin 4 is fed 38 into frame 6. Hammer 10 is forced 40 against landscape pin 4 to drive landscape pin 4 through slot 22 in base 8. In one embodiment, hammer 10 is forced 40 against landscape pin 4 by applying pressure to a foot lever coupled to hammer 10. In an alternate embodiment, hammer 10 is forced 40 against landscape pin 4 by applying hydraulic pressure to hammer 10. In another alternate embodiment, hammer 10 is forced 40 against landscape pin 4 by applying pneumatic pressure to hammer 10.

Hammer 10 is prevented 42 from passing through slot 22. In one embodiment, hammer 10 is prevented from passing through slot 22 by stop means 26 on hammer 10. In another embodiment, hammer 10 is prevented from passing through slot 22 by stop means 28 on tool 2.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A tool for driving a landscape pin, the tool comprising:

a frame sized to house the landscape pin;

a base attached to the frame and having a slot formed therein, the slot disposed within the frame and sized and shaped to accommodate passage of the landscape pin;

an adaptor plate affixed to the base, the adaptor plate shaped to partially surround a diameter of a hose;

a hammer disposed within the frame and aligned with the slot; and driving means for applying force to the hammer to drive the landscape pin from the frame and through the slot.

2. The tool of claim 1 wherein the base has a thickness similar to a thickness of the landscape pin.

3. The tool of claim 1 further including stop means for preventing the hammer from passing though the slot.

4. The tool of claim 1 wherein the hammer including stop means for preventing the hammer from passing through the slot.

5. The tool of claim 1 wherein the driving means includes a foot lever coupled to the hammer and passing through the frame.

6. The tool of claim 1 wherein the driving means includes a hydraulic driver.

7. The tool of claim 1 wherein the driving means includes a pneumatic driver.

8. The tool of claim 1 wherein the driving means includes an electrical driver.

9. The tool of claim 1 further including a return spring configured to resist the driving means and urge the hammer away from the slot.

10. The tool of claim 1 wherein the hammer includes a cupped edge disposed towards a landscape pin within the frame and wherein the cupped edge is shaped to receive the landscape pin.

11. The tool of claim 1 further including a landscape pin magazine attached to the frame and configured to feed the landscape pin into the frame.

* * * * *